Jan. 16, 1968  R. N. ANDERSON  3,363,922
CORNER STRUCTURE
Filed Oct. 11, 1965

INVENTOR.
RICHARD N. ANDERSON
BY *Whittemore, Hulbert
& Belknap*
ATTORNEYS

United States Patent Office 3,363,922
Patented Jan. 16, 1968

3,363,922
CORNER STRUCTURE
Richard N. Anderson, Rome, Ga., assignor to V. E. Anderson Mfg. Co., Owensboro, Ky., a corporation of Kentucky
Filed Oct. 11, 1965, Ser. No. 494,360
6 Claims. (Cl. 287—189.36)

ABSTRACT OF THE DISCLOSURE

Corner structure for jalousie doors or the like constructed of hollow aluminum extrusions having a substantially rectangular cross section wherein the end of one extrusion abuts one side of another extrusion and fastening means are provided between the said end of the one extrusion and the one side of the other extrusion for securing the extrusions together. Parallel sides of the one extrusion are offset at the edges thereof and extended in the plane of the sides of the other extrusion which are perpendicular to the one side thereof, and the sides of the other extrusion perpendicular to the one side thereof are extended to overlap the one end of the one extrusion and are abutted against the offset sides of the one extrusion.

The fastening means comprises U-shaped fastening clips passed through openings in the end of the one extrusion and screws extending through the one side of the other extrusion into the fastening clips so that the fastening means are completely within the extrusions and are not visible.

---

In the past doors such as jalousie doors or the like constructed of aluminum extrusions have not received universal acceptance due to the appearance of the corner structure usually provided. The corner structures have been provided with external screws, clips or the like which while providing a strong rigid joint when exposed are not aesthetically pleasing.

Prior corner constructions for extrusions wherein it has been attempted to provide an aesthetic appearance such as through the use of welding, mitered corners, rigid foam corner inserts and the like have not been successful. These joints have in the past either not had the necessary rigidity or have been complicated, expensive to produce or inefficient in operation due to lack of rigidity or the like.

It is therefore one of the objects of the present invention to provide improved corner structure for doors or the like.

Another object is to provide corner structure constructed of extrusions which is particularly strong and rigid with no visible external fasteners.

Another object is to provide corner structure including a first generally rectangular extrusion including an end, a second generally rectangular extrusion including a side adjacent one end thereof with the end of the first extrusion abutting the side of the other extrusion and means entirely within the extrusions for securing the end of the one extrusion to the side of the other extrusion.

Another object is to provide structure as set forth above wherein the other extrusion includes flanges extending from the sides thereof in surface-to-surface engagement with parallel sides of the one extrusion.

Another object is to provide structure as set forth above wherein the one extrusion is provided with flanges off-set and extending from said parallel sides thereof in end abutment with the flanges of said other extrusion.

Another object is to provide corner structure as set forth above wherein the means for securing the extrusions together comprises at least one opening in a side of the one extrusion adjacent the end thereof, a screw clip extending through the opening and a screw extending through the side of the other extrusion and into the screw clip.

Another object is to provide corner structure as set forth above and further including a back-up plate within the other extrusion in surface-to-surface engagement with the side thereof through which the screw also extends.

Another object is to provide structure for securing extrusions together at right angles with the end of one extrusion abutting the side of another extrusion comprising an opening through the side of the one extrusion adjacent the end thereof, a resilient C-shaped screw clip having outwardly extending flanges depending from the ends thereof inserted within the opening through the one extrusion and a screw extending through the side of the other extrusion and into the screw clip.

Another object is to provide corner structure as set forth above which is simple in construction, economical to manufacture and efficient in use.

Other objects and features of the invention will become apparent as the description proceeds especially when taken in conjunction with the accompanying drawings illustrating a preferred embodiment of the invention, wherein.

With particular reference to the figures of the drawings one embodiment of the present invention will now be considered in detail.

Figure 2:
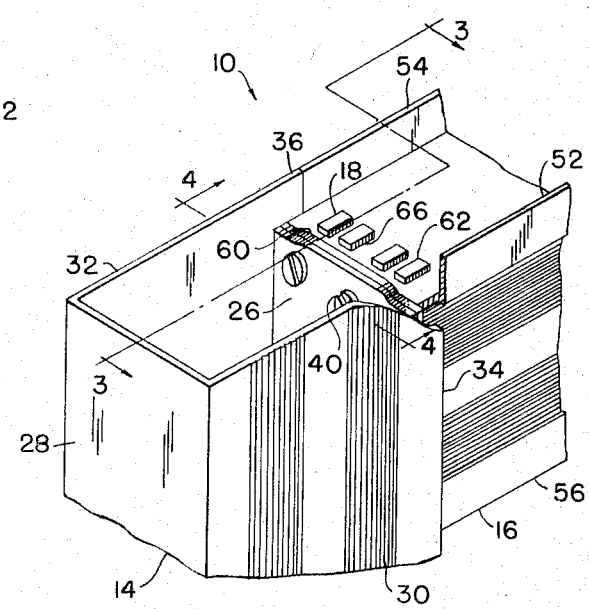
FIGURE 2 is a partially broken away enlarged perspective view of the upper letfhand corner of the door illustrated in FIGURE 1.
Figure 3:
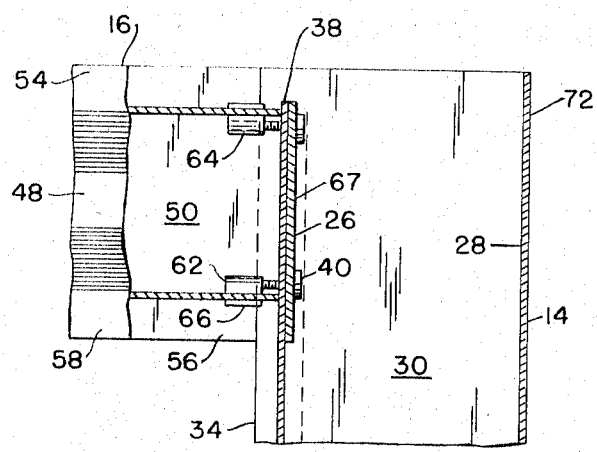
FIGURE 3 is a section view of the corner structure illustrated in FIGURE 2 taken substantially on the line 3—3 in FIGURE 2.
Figure 4:
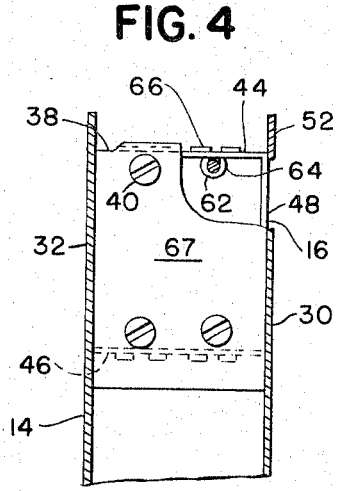
FIGURE 4 is a section view of the corner structure illustrated in FIGURE 2 taken substantially on the line 4—4 in FIGURE 2.

The corner structure 10 for a door 12 or the like is best shown in FIGURE 2 and includes the door stile extrusion 14 and rail extrusion 16. The stile 14 and rail 16 are secured together by the structure 18 for securing the end of one extrusion to the side of the other extrusion.

Figure 1:
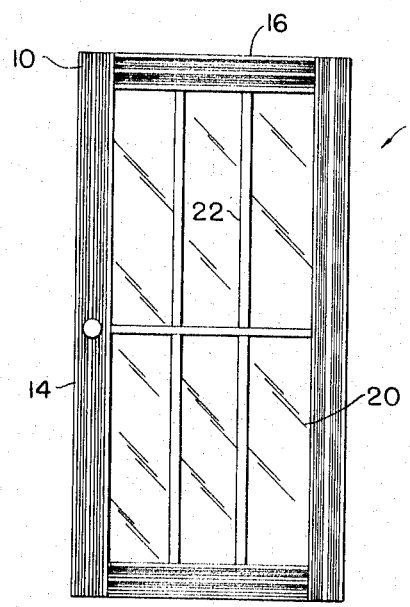
FIGURE 1 is an elevation view of a door having an aluminum extrusion frame with corner structure constructed in accordance with the invention.

More specifically the door 12 includes the two vertically extending stiles 14 and the top and bottom rail 16. Closure panels such as glass panes 20 and frames 22 therefor are inserted within the rectangle formed by the sides 14 and rails 16 as best shown in FIGURE 1.

The stile extrusions 14 as best shown in FIGURE 2 have a generally rectangular cross section including an inner side 26, an outer side 28 and a pair of parallel sides 30 and 32 extending therebetween. The sides 30 and 32 extend beyond the inner side 26 to provide flanges 34 and 36 respectively. Openings are provided through the inner side 26 to receive the screws 40 as will be considered subsequently.

The rails 16 have a generally rectangular cross section and are provided with an outer side 44, an inner side 46 and a pair of parallel sides 48 and 50 extending therebetween. The sides 48 and 50 are provided with off-set edge portions extending beyond the outer side 44 and inner side 46 to form the outer flanges 52 and 54 and the inner flanges 56 and 58, respectively. The flanges 52, 54, 56 and 58 are offset from the sides 48 and 50 so that they are in alignment with the flanges 34 and 36 of the stiles 14. Openings 60 are provided through the sides 44 and 46 of the rails 16 and the flanges 52, 54, 56 and 58 are cut back from the ends of the rails a distance substantially equal to the distance the flanges 34 and 36 extend beyond the side 28 of the stiles 14.

The structure 18 for securing the end of the rails 16 to the side of the stiles 14 includes the screw clips 62 having a generally C-shaped body portion 64 with the outwardly extending flanges 66 depending from the ends thereof and the screws 40. The screw clips 62 are constructed of resilient material such as aluminum which may be similar to that from which the stiles, rails and inserts of the door 12 are produced. The body portion of the screw clips 62 is so dimensioned that it must be forced through an opening 60. After the body portion 64 of the screw clip 62 is positioned within an opening 60 the flanges 66 are allowed to separate due to the natural resiliency of the material from which the screw clip 62 is constructed whereby the screw clip is secured in the opening 60 to receive a screw 40 inserted thereinto through an opening in the side 26 of a stile 14. The back-up plate 67 is provided to reinforce the side 26 of stile 14 where the screws 40 extend therethrough.

Thus, in overall assembly the screw clips 62 are secured in the openings 60 in the rails 16. The stiles 14 are positioned in engagement with the rails 16 with the ends of the rails 16 in abutment against the inner side 26 of the stiles 14. The inner surface of flanges 34 and 36 of the stiles 14 will thus be in surface-to-surface contact with the outer surface of the sides 48 and 50 of the rails 16 and the flanges 34 and 36 will abut the ends of the flanges 52, 56, 54 and 58. The back-up plates 67 are positioned in stiles 14 and screws 40 are then extended through openings in the sides 26 of the stiles 14 into the screw clips 18 and tightened by means of a tool such as a 90° right angle screw gun to form extremely rigid corner structures for the door 12 in which the structure for securing the stiles and rails together is completely within the stiles and rails so that no objectionable connecting structure is visible from the exterior of the door 12 as shown in FIGURE 1.

While one embodiment of the present invention has been considered in detail, it will be understood that other embodiments and modifications thereof are contemplated by the inventor. It is the intention to include all embodiments and modifications as are defined by the appended claims within the scope of the invention.

What I claim as my invention is:

1. Corner structure for a door or the like comprising a vertically extending stile having a generally rectangular cross section including an inner side, an outer side and a pair of parallel sides extending between the parallel inner and outer sides, said parallel sides extending beyond said inner side to provide flanges at the inner side of the stile, a rail having a generally rectangular cross section including an upper side and a lower side and a pair of parallel sides extending between the upper side and lower side, said parallel sides of the rail being offset at the edges thereof and extending beyond the upper side and lower side to form flanges at the top and bottom of the rail which are notched at the end of the rail a dimension equal to the extension of the flanges on the stile past the inner side of the stile, said end of the rail abutting the inner side of the stile at the end thereof with the flanges of the stile abutting the flanges of the rail and in surface-to-surface engagement on the interior thereof with the exterior of the parallel sides of the rail and means within the extrusions for securing the end of the rail to the inner side of the stile.

2. Structure as set forth in claim 1 wherein the extrusions are aluminum and a back-up plate is positioned within the end of the stile in surface-to-surface engagement with the inner side thereof for reinforcing the inner side thereof to prevent damage by the securing means.

3. Structure as set forth in claim 1 wherein the means for securing the end of the rail to the side of the stile includes a plurality of screw clips secured within the end of the rail and a plurality of screws extending through the side of the stile and into the screw clips.

4. A pair of extrusions each having a substantially rectangular cross section, the end of one of the extrusions abutting one side of the other of said extrusions at the end of the other extrusion, the opposite sides of said other extrusion perpendicular to the one side thereof extending past the one side thereof to form flanges snugly securing the corresponding sides of said one extrusion therebetween, the corresponding sides of the one extrusion including offset edge portions aligned with the said opposite sides of the said other extrusion forming flanges extending outwardly of the sides of the one extrusion extending perpendicular to the said corresponding sides thereof and abutting the edges of the said flanges of the other extrusion.

5. A pair of extrusions each having a substantially rectangular cross section, the end of one of the extrusions abutting one side of the other of said extrusions at the end of the other extrusion, the opposite sides of said other extrusion perpendicular to the one side thereof extending past the one side thereof to form flanges snugly securing the corresponding sides of the one extrusion therebetween, the corresponding sides of the one extrusion including offset edge portions aligned with the said opposite sides of the said other extrusion forming flanges extending outwardly of the sides of the one extrusion extending perpendicular to the said corresponding sides thereof and abutting the edges of the said flanges of the other extrusion, and means extending through the one side of the other of said extrusions and completely within the extrusions for securing the end of the one extrusion to the side of the other extrusion in rigid corner construction without externally visible fastening means.

6. A pair of extrusions each having a substantially rectangular cross section, the end of one of the extrusions abutting one side of the other of said extrusions at the end of the other extrusion and means extending through the one side of the other of said extrusions and completely within the extrusions for securing the end of the one extrusion to the side of the other extrusion in rigid corner construction without externally visible fastening means comprising screw clip secured within the end of the one extrusion and screws extending through the side of the other extrusion and into the screw clips.

References Cited

UNITED STATES PATENTS 2,918,708  12/1959  Sharp et al. _____ 52—656

CARL W. TOMLIN, *Primary Examiner.*

WAYNE L. SHEDD, *Assistant Examiner.*